United States Patent [19]

Bezner et al.

[11] Patent Number: 5,556,661
[45] Date of Patent: Sep. 17, 1996

[54] PROCESS FOR PREPARING DUMPLINGS FROM STARCH SPONGE IN BOIL-IN-BAG PACKAGE

[75] Inventors: Klaus Bezner, Untergruppenbach-Unterheinrie; Horst Klukowski, Heuenstadt-Kochertuern; Hans Schupp, Erienbach, all of Germany

[73] Assignee: CPC International Inc., Englewood Cliffs, N.J.

[21] Appl. No.: 489,089

[22] Filed: Jun. 9, 1995

[30] Foreign Application Priority Data

Jun. 14, 1994 [DE] Germany ............... 44 20 702.6

[51] Int. Cl.⁶ ..................................... A21D 10/02
[52] U.S. Cl. ................. 426/549; 426/113; 426/128; 426/410; 426/412; 426/578
[58] Field of Search .................. 426/412, 410, 426/128, 578, 549, 113, 111; 127/65, 67, 29

[56] References Cited

U.S. PATENT DOCUMENTS 3,567,468  3/1971  Tressler ........................ 99/193
3,989,855  11/1976  Jones et al. ................... 426/444
4,064,282  12/1977  Hallstrom ...................... 426/559
4,717,578  1/1988  Biller et al. ................... 426/589
4,886,675  12/1989  Jodlbauer ....................... 426/242

FOREIGN PATENT DOCUMENTS 2938596  4/1981  Germany.
3716467  12/1988  Germany.
62-210957  3/1988  Japan.

*Primary Examiner*—Esther M. Kepplinger
*Assistant Examiner*—Lien Tran

[57] ABSTRACT

A process for the production of dimensionally stable, sliceable, starch-containing products, in particular dumplings, in boil-in-bag packages, which comprises at least partially gelatinizing the starch-containing starting material, then freezing it, comminuting the frozen starch sponge, thawing it by pressing and/or drying after dewatering, and packaging it in boil-in-bag packages, the fill quantity and the remaining head space in the bags being dimensioned in such a way that the cooked product completely fills the boil-in-bag packages and dimensionally stable, sliceable, edible products result owing to the pressure of the hydrated contents of the bag against the bag wall.

7 Claims, No Drawings

PROCESS FOR PREPARING DUMPLINGS FROM STARCH SPONGE IN BOIL-IN-BAG PACKAGE

BACKGROUND OF THE INVENTION

The present invention relates to the production of boil-in-bag preparations and particularly to a process for the production of dimensionally stable, sliceable, starch-containing products, such as dumplings, in a boil-in-bag package. The process comprises at least partially gelatinizing the starch-containing starting material, freezing it, comminuting the frozen starch sponge, thawing, dewatering it by pressing and/or drying, and packaging it in a boil-in-bag package. The fill quantity and the remaining head space in the bag are dimensioned in such a way that the cooked product completely fills the boil-in-bag package and a dimensionally stable, sliceable, edible product results from the pressure of the hydrated contents of the bag against the bag wall.

Boil-in-bag preparations have increasingly been gaining importance in recent decades because of their convenience. This applies particularly to rice products and dumpling products such as potato dumplings and bread dumplings. Despite the different character of these products, they have one feature in common: both absorb large amounts of water in preparation, particularly when boiled, i.e. they swell and occasionally experience increases in volume.

In the case of rice, and other cereal products such as farina and pearl barley, this swelling is taken into account in traditional cooking, by beginning the cooking operation with a considerable excess of water or liquid. Also in the case of less coarse grained products such as rice, as the swelling increases, the uniform distribution and thus availability of the water required for further swelling must be ensured by occasional stirring. This type of preparation is relatively complex, and requires a certain amount of supervision, without which the preparation does not, or only partially, succeeds. Moreover, this process poses difficulties in the case of very large portions, and also very small portions.

Because of the current trend towards convenience (which is equivalent to simpler preparation in this case) and towards progressively smaller households, there is a requirement for dependable and simple preparation of such products in portions. A preparation which meets this requirement is the boil-in-bag preparation of rice which is limited to parboiled rice. To date, farina, pearl barley and the like have not been able to be prepared in boil-in-bag packages, which have proved useful for rice. This is because the great volume increase on swelling means that only a little may be packaged in the bag, and also because uniform, homogeneous swelling and distribution in the bag cannot be ensured. Although boil-in-bag rice essentially achieves good and uniform rehydration, when dealing with dumpling products a defined shape must also be ensured.

Against this background, the development of easy to use dumpling products has been achieved in two steps. The first step was the development of completely formulated dry products which, after preparation with the appropriate amount of liquid (usually by hand), only had to be shaped and cooked. The introduction of the boil-in-bag package was step two, thereby removing the shaping of the dough from the consumer or chef. In order to achieve this result, a boiling-resistant, boil-in-bag package had to be developed, and the perforation thereof had to be arranged in such a way that rapid penetration of the water is ensured, while no excessively large cooking losses, nor blockage of the pores occurred.

Even more important than the development of a suitable film, was the adaptation of the formulation or the selection and development of suitable ingredients, since the rapid, complete and uniform penetration of the liquid entering through the bag pores was required since the conventional mixing or kneading of the dough could not carried out in this case. A mixture suitable for the boil-in-bag package must absorb sufficient water in order to ensure the swelling and filling of the bag to give the desired shape and ensure cooking, but must not swell too rapidly and too vigorously until all the liquid has entered through the pores.

A number of the conventional ingredients posed few problems in this respect, such as, for example, bread crumbs and dried potato flour, which are distinguished by a relatively slow water absorption, have a porous structure as such and, because of their piece size, give a lose, macroporous bulk. Although the bread dumpling mass, porous and in pieces per se, does bind water to a considerable extent on boiling, it is comparatively, dimensionally stable and swells comparatively little. Bread dumplings can therefore also be prepared without problem in relatively large, cylindrical boil-in-bag packages.

However, other traditional formulation components such as mashed potato powder and swelling starches had to be appropriately modified because of their rapid water absorption and high swelling characteristics. One modification, which has proved to be useful in this respect, was the production of so-called pellets. In the production of pellets, the raw material in question (for example potatoes or rice) is comminuted, as described, for example, in DE 37 16 467, in well-hydrated form (usually after precooking) with the aid of an extruder, mincer or the like and, generally with the addition of other ingredients, such as binders, is shaped to form strands of the desired diameter. These are then cut up into slices of equal thickness (pellets) with the aid of a suitable cutter, and are dried. Pellets produced in this manner have a certain, albeit low, porosity which ensures the penetration of the liquid into the pellet, and they ensure, as a result of their size (3–5 mm) and their generally lens-like shape, an open and loose bulk. As a result of this adaptation of the formulation components to the specific requirements in the boil-in-bag package, goods products which are reliable and uniform, are now available.

However, there continues to be problems with rice and cereal products, especially when these are to be produced in a highly specific shape, e.g. a sliceable, cylindrical roll, the boil-in-bag package (as is desirable for the production of decorative accompaniments, especially in catering or restaurants). There are also difficulties with potato dumplings when these are prepared in relatively large boil-in-bag packages, as is demanded in catering. Obviously, the measures described above are not sufficient to ensure rapid and uniform rehydration. Dry, insufficiently hydrated, uncooked portions are frequently found in the finished product and, if the access of liquid into the interior is particularly inadequate, cavities or holes are also found.

A fundamental problem with both product groups is that the products or mixtures when in dry form only partially fill the boil-in-bag package, but completely fill it after corresponding swelling which takes place predominantly during the cooking operation.

This leads to uneven water absorption and thus inhomogeneous products, and also, with the then very high head space volume, to a twisting of the bag and thus to an undesirable deformation of the product.

Therefore, there is a requirement for ingredients which are highly porous, rapidly absorb water, can be produced in varying sizes, swell comparatively little, are relatively dimensionally stable and simultaneously bind water during cooking for preparation in boil-in-bag packages, particularly for preparation in relatively large boil-in-bag packages. Surprisingly, it has now been found that ingredients which are produced by the so-called "sponge technique" ideally satisfy these requirements, especially in combination with previously used ingredients.

This technique (used for example, in DE 29 38 594 for the production of a tomato product which is dry after reconstitution) starch-containing ingredients are first frozen, then the liquid released from the sponge formed by the retrogradation of the starch is separated off in an appropriate manner and the product is dried. With the aid of this technique, the above described problems in the preparation in boil-in-bag packages are surprisingly overcome.

SUMMARY OF THE INVENTION

The process according to the present invention for the production of boil-in-bag preparations relates in particular to a process for the production of dimensionally stable, sliceable, starch-containing products, in particular dumplings, in a boil-in-bag package, which comprises at least partially gelatinizing the starch-containing starting material, then freezing it, comminuting the frozen starch sponge, after dewatering it thawing by pressing and/or drying, and packaging it in a boil-in-bag package, the fill quantity and the remaining head space in the bag being dimensioned in such a way that the cooked product completely fills the boil-in-bag package and a dimensionally stable, sliceable, edible product results owing to the pressure of the hydrated contents of the bag against the bag wall.

The ingredients produced by the sponge technique, owing to their low bulk density and their high bulk volume, generally completely fill the boil-in-bag packages and, owing to their porosity, guarantee a complete and uniform rehydration and an optimal cooking behavior. The sponge technique can be applied to all starch-containing products, i.e. to potato products just as to rice, farina, pearl barley and other cereals, and these ingredients are particularly suitable for the production of "Serviettenknödel" (dumplings traditionally cooked wrapped in a cloth) and similar products, which could not previously be produced for the boil-in-bag preparation, particularly not at the level of quality known from traditional production.

Obviously, porous ingredients which are sufficiently piece-like can also be produced with the aid of other techniques, e.g. by baking, such as breadcrumbs. The extrusion of starch-rich products also leads to analogous structures. However, for the problems described here, these processes can only be limitedly applied since in both processes the properties of the ingredients are generally changed in an undesirable manner. The baking process cannot be applied, for example, to potatoes or vegetables. Additionally, with extrusion, the high temperatures, and especially the high shear forces, completely destroy the initial structure of the ingredients. The process according to the present invention does not have these disadvantages and permits the production of a multiplicity of ingredients suitable for use in the boil-in-bag package, as is shown by the examples below.

The ingredients produced according to the present invention can also be combined with a multiplicity of traditional as well as unconventional ingredients, as a result of which the variety of products which can be prepared in the boil-in-bag package can be enlarged to a considerable extent.

To produce the versatile boil-in-bag preparations, flavor ingredients, aroma ingredients, vegetable ingredients and/or other conventional ingredients are added to the starch-containing starting material prior to pregelatinization and/or to the comminuted starch sponge. In some cases it is also expedient to add other water-binding additives in powder form or pellet form. The type and properties of the final product can be particularly specifically controlled by mixing together and further processing a plurality of differently produced starch sponges.

If the starting material does not have sufficient starch content for producing the starch sponge, a sufficient quantity of foreign starch can be added to the starting material prior to the sponge formation or such a foreign starch can be used as starting material.

DETAILED DESCRIPTION OF THE INVENTION

The production process according to the present invention and the ingredients resulting therefrom feature the following advantages:

1. It is a particularly gentle production process, i.e. retaining aroma and flavor substances.
2. The process can be applied to a large number of starting materials of vegetable as well as animal origin, in particular even to those which do not develop a sponge structure on freezing, by adding the necessary amount of starch for sponge formation. Starch quantities are generally sufficient in this case which do not impair the flavor and aroma properties typical of the product.
3. The bulk density and the bulk volume and the porosity (which, furthermore, can also be influenced by the freezing step) can be varied within broad ranges by means of the water content in freezing and thus matched to the requirements imposed by the remaining ingredients and the bag volume.
4. The particle size of the ingredients according to the invention which have a sponge-like, porous structure can be adapted, for example by appropriate grinding, as needed, such as the particle size of the remaining ingredients. Generally, the grain size is from about 0.6 to 12 mm, preferably from about 1 to 4 mm.
5. Other important ingredients such as herbs, spices and the like can be fixed in the starch matrix forming the sponge structure. Thus, uniform distribution is ensured not only in the bulk material but particularly in the final product, and floating of these ingredients to the surface is prevented.
6. The use of the ingredients according to the invention guarantees a simple preparation free from constant supervision.
7. The shape and size of the products to be prepared in boil-in-bag packages can be adapted as required to the particular requirement (ball, cylinder, roll etc.).
8. The good sliceability of the products produced with the ingredients according to the invention permits reliable cutting up of the portions prepared, e.g. into slices or other decorative shapes, as are required in catering businesses.
9. Any quantities required can be prepared by simultaneous preparation of the necessary number of individual portions.
10. Other ingredients, such as wild rice, vegetables etc. can be incorporated and homogeneously distributed, into the filling, as resulting in other products with interesting flavors and attractive appearances.

EXAMPLE 1-POTATO "SERVIETTENKNÖDEL"

Production of the starch sponge:

A 10% strength potato starch suspension was gelatinized by heating to about 80° C. and then frozen in a plate freezer. The frozen plates were comminuted at about 0° C., the resulting granules were completely thawed, partially dewatered in a press and dried in a circulating-air dryer to a water content of 4%.

The resulting granules had a grain size of 1–4 mm and a bulk weight of 110 g/l and a bulk volume of 910 mm/100 g.
Production of the "Serviettenknödel"
A mixture was produced or 260 g of potato pellets (diameter about 4 mm, thickness between 0.5 and 0.8 mm produced from potato flour, starch and a spice mixture)

26 g of the potato starch sponge produced above.

The mixture thus produced had a bulk volume of 800 ml/100 g, the sealing-related head space after packaging into the bag was 50 ml. Because of the rapid and uniform water absorption, a homogeneously cooked dumpling was obtained.

In comparison thereto, a dumpling mass analogously produced only from pellets had a bulk volume of only 609 ml/100 g, the head space in the boil-in-bag package was 192 ml and because of the uneven entry of water, unevenly cooked products, and occasionally deformed products, are obtained.

EXAMPLE 2-VEGETABLE "SERVIETTENKNÖDEL"

Production of potato granules having a sponge structure

Starch-rich potatoes of density about 1.1 g/ml were diced (4×4×4 mm), blanched and, as in Example 1, frozen, thawed and dried in circulating-air dryers.

The product thus obtained had a bulk density of 305 g/l and a bulk volume of 330 ml/100 g.

Production of the potato "Serviettenknödel" 96 g of the above produced diced potato and 224 g of the potato pellets from Example 1 produced a mixture with a bulk volume of 250 ml/100 g which completely filled an 800 ml bag up to the packaging-related head space of 50 ml rand therefore gave a homogeneously cooked potato dumpling after preparation.

EXAMPLE 3-VEGETABLE "SERVIETTENKNÖDEL"

Preparation of the vegetable sponge

A mixture of 680 g of broccoli florets, cooked and pureed, 200 g of water and 120 g of potato starch was heated to 85°–90° C. for complete gelatinization of the starch, frozen in a plate freezer and, as in Example 1, granules having a grain size of 1–4 mm were produced.

The granules thus obtained had a bulk weight of 160 g/l and a bulk volume of 625 ml/100 g.
Production of the vegetable "Serviettenknödel"

A mixture was produced of 250 g of potato pellets (according to Example 1) and the above vegetable sponge granules. The mixture thus obtained had a bulk volume of 785 ml and 275 ml/100 g, respectively, and thus, in comparison to the potato dumpling pellets (213 ml/100 g), a significantly higher bulk volume. Thus, the head space of the bag was again reduced to a packaging-related minimum volume and a uniform water absorption and homogeneous cooking was ensured.

EXAMPLE 4-RICE "SERVIETTENKNÖDEL"

Production of rice granules having sponge structure

Round grain rice was cooked in water (rice/water ratio about 1:1.7) and frozen after cooling (if required in cold water). The plates obtained analogously to Example 1 were comminuted during thawing and the rice grains with a porous structure as a result of the freezing and thawing were dried in the circulating-air dryer to a water content of about 6%.

The granules thus obtained, in comparison to round grain rice (bulk weight 480 g/l and bulk volume 210 ml/100 g) had a bulk density of 320 g/l and a bulk volume of 310 ml/100 g.

By varying the rice/water ratio, the bulk volume could be adjusted both to higher and to lower values and thus matched to the particular requirement. For example, at a ratio of 1:1.5, a bulk volume of 295 ml/100 g results and at the ratio 1:2, a bulk volume of 325 ml/100 g.

Production of a rice "Serviettenknödel"

260 g of the above produced rice granules having a bulk volume of 310 ml/100 g completely filled the bag and, in contrast to the conventional boil-in-bag rice, gave a sliceable dumpling which could be portioned accordingly, for example as a sliced accompaniment.

Proportions of up to 10% of dried vegetables could be added to the rice granules.

We claim:

1. A process for the production of dimensionally stable, sliceable, starch-containing dumplings in a boil-in-bag package, which comprises a) at least a partially gelatinizing a starch-containing starting material;

b) freezing the partially gelatinized, starch-containing material to form a frozen starch;

c) comminuting the frozen starch;

d) thawing and dewatering the frozen and comminuted starch by pressing and/or drying to form a comminuted starch sponge; and e) packaging the comminuted starch sponge in a porous boil-in-bag package, such that the comminuted starch sponge and remaining head space in the bag are dimensioned in such a way that the comminuted starch sponge completely fills the boil-in-bag package and forming a single dimensionally stable, sliceable, edible dumpling product comprising the comminuted starch sponge, resulting from absorbing water through the porous bag during cooking in water and from the pressure of the hydrated contents of the bag against the bag wall.

2. The process as claimed in claim 1, which further comprises adding additional ingredients to the starch-containing starting material prior to the at least partially gelatinizing step wherein the ingredients are chosen from the group consisting of flavor, aroma, vegetable ingredients, and combinations thereof.

3. The process as claimed in claim 1, wherein the frozen starch is comminuted to a grain size of from about 0.6 to 12 mm.

4. The process as claimed in claim 1, wherein water-binding ingredients in powder or pellet form are added to the comminuted starch sponge.

5. The process as claimed in claim 1, wherein the starch-containing starting material is chosen from the group consisting of rice, cereal products, potatoes or combinations thereof.

6. The process as claimed in claim 1, wherein a plurality of separately prepared comminuted starch sponges are mixed together and then processed.

7. The process as claimed in claim 1 which further comprises adding to the starch-containing starting material, prior to the sponge formation, an amount of additional starch sufficient for a sponge formation.

* * * * *

UNITED STATES PATENT AND TRADEMARK OFFICE
CERTIFICATE OF CORRECTION

PATENT NO. : 5,556,661
DATED : September 17, 1996
INVENTOR(S) : K. Bezner, et al.

It is certified that error appears in the above-indentified patent and that said Letters Patent is hereby corrected as shown below:

Column 5, line 16, delete "or" and substitute therefor -- of --.

Column 5, line 44, after "Serviettenknodel" the phrase "96 g of the" should start a new paragraph.

Column 5, line 48, delete "rand" and substitute therefor -- and --.

Column 6, line 42, after "least" and before "partially," delete "a."

Column 6, line 53, after "and" and before "remaining," insert -- a --.

Column 8, line 7, after "for" and before "sponge," delete "a" and insert -- the --.

Signed and Sealed this

Twenty-fourth Day of June, 1997

Attest:

*Attesting Officer*

BRUCE LEHMAN
*Commissioner of Patents and Trademarks*